(12) United States Patent  (10) Patent No.: US 9,323,624 B2
Miyoshi et al.  (45) Date of Patent: Apr. 26, 2016

(54) FILE MANAGEMENT SYSTEM AND FILE MANAGEMENT METHOD

(75) Inventors: Osamu Miyoshi, Tokyo (JP); Eiichiro Shioda, Tokyo (JP); Hiroyuki Fujita, Tokyo (JP)

(73) Assignee: OREGA INC., Tokyo (JP)

( * ) Notice: Subject to any disclaimer, the term of this patent is extended or adjusted under 35 U.S.C. 154(b) by 0 days.

(21) Appl. No.: 14/130,642

(22) PCT Filed: Aug. 20, 2012

(86) PCT No.: PCT/JP2012/071013
§ 371 (c)(1),
(2), (4) Date: Jan. 2, 2014

(87) PCT Pub. No.: WO2013/035517
PCT Pub. Date: Mar. 14, 2013

(65) Prior Publication Data
US 2014/0136485 A1  May 15, 2014

(30) Foreign Application Priority Data

Sep. 7, 2011  (JP) .................................. 2011-194796

(51) Int. Cl.
*G06F 17/30* (2006.01)
*G06F 7/00* (2006.01)
*G06F 11/14* (2006.01)
*G06F 3/06* (2006.01)

(52) U.S. Cl.
CPC .......... *G06F 11/1458* (2013.01); *G06F 3/0617* (2013.01); *G06F 3/0664* (2013.01); *G06F 3/0689* (2013.01); *G06F 11/1469* (2013.01); *G06F 11/1456* (2013.01); *G06F 2201/815* (2013.01)

(58) Field of Classification Search
USPC ....................................................... 707/654
See application file for complete search history.

(56) References Cited

U.S. PATENT DOCUMENTS

| 6,185,574 B1* | 2/2001 | Howard et al. |
| 6,567,889 B1* | 5/2003 | DeKoning et al. ............ 711/114 |
| 7,107,395 B1 | 9/2006 | Ofek et al. |
| 7,720,817 B2* | 5/2010 | Stager et al. .................. 707/649 |
| 2004/0098547 A1 | 5/2004 | Ofek et al. |
| 2005/0154731 A1* | 7/2005 | Ito et al. .......................... 707/10 |
| 2010/0023717 A1 | 1/2010 | Jinno et al. |
| 2011/0087874 A1 | 4/2011 | Timashev et al. |

FOREIGN PATENT DOCUMENTS

| EP | 12830182.7-1954 | 8/2014 |
| JP | 2003-518659 A | 6/2003 |
| JP | 2005-157949 A | 6/2005 |
| JP | 2007-199756 A | 8/2007 |
| JP | 2007-199922 A | 8/2007 |
| JP | 2010-26940 A | 2/2010 |
| JP | 2010-123066 A | 6/2010 |
| JP | 2010-152781 A | 7/2010 |
| JP | 2010-213770 A | 10/2010 |
| WO | WO 98/24025 | 6/1998 |
| WO | WO 00/41093 | 7/2000 |

* cited by examiner

*Primary Examiner* — Kuen Lu
(74) *Attorney, Agent, or Firm* — Ming Chow; Sinorica, LLC

(57) ABSTRACT

[Problem] To provide a file management system and file management method that are able to perform a backup process efficiently by means of a configuration that uses a virtual file system metadatabase from a backup process side also. [Solution] The file management system is provided with a virtual drive controller (110) that controls a virtual drive (5), a metadatabase (210) that contains information for associating a virtual file and a physical file that is saved in a storage device (6), a backup controller (120) that manages the backup process of a file, and a backup status management database (220) used in backup process management. The virtual drive controller (110) registers updated file information in the backup status management database (220). The backup controller (120) references the backup status management database (220) and the metadatabase (210), and backs up the file.

11 Claims, 11 Drawing Sheets

Metadatabase for Master Virtual Drive 210a

| File ID | Virtual Path | Physical Path | File Name | File Size | Update Date/Time |
|---|---|---|---|---|---|
| 0 | V_PATH0 | P_PATH0 | FNAME0 | FSIZE0 | UDATE0 |
| 1 | V_PATH1 | P_PATH1 | FNAME1 | FSIZE1 | UDATE1 |
| 2 | V_PATH2 | P_PATH2 | FNAME2 | FSIZE2 | UDATE2 |
| 3 | V_PATH3 | P_PATH3 | FNAME3 | FSIZE3 | UDATE3 |
| ... | ... | ... | ... | ... | ... |

Metadatabase for Backup Virtual Drive 210b

| File ID | Virtual Path | Physical Path | File Name | File Size | Update Date/Time |
|---|---|---|---|---|---|
| 0 | V_PATH0 | P_PATH0 | FNAME0 | FSIZE0 | UDATE0 |
| 1 | V_PATH1 | P_PATH1 | FNAME1 | FSIZE1 | UDATE1 |
| 2 | V_PATH2 | P_PATH2 | FNAME2 | FSIZE2 | UDATE2 |
| 3 | V_PATH3 | P_PATH3 | FNAME3 | FSIZE3 | UDATE3 |
| ... | ... | ... | ... | ... | ... |

FIG. 11

FILE MANAGEMENT SYSTEM AND FILE MANAGEMENT METHOD

TECHNICAL FIELD

The present invention relates to a file management system and a file management method, in particular, those characterized by backup processing.

BACKGROUND ART

File servers are a widely used to store computer files across communication networks. File servers provides folder trees on file systems of a server OS, enabling users to share drive roots and specific folders with access control.

Users sharing files and folders can browse files from their terminals (e.g. PCs and cellular phones) across a communication network. They also can open, close, create, move, rename, and copy any files, based on access authorization set by the system administrators of the file servers. Here, the users can be humans or computer systems such as machines and software programs.

When the users open the files stored on the servers, they browse shared folders on the servers from the user terminals; then, the user terminals request to file servers to transmit files, specifying those files; and, the file servers transmit those files to the user terminal across the communication network.

There is a common technology called RAID (Redundant Arrays of Inexpensive Disk) to make hard disk devices on the file servers faster and/or more redundant.

RAID is a technology that combines multiple hard disks, making them recognized as one virtual hard disk drive for an operating system. It is used mainly to improve reliability. Besides, RAID and backup software programs are often used together to ensure continuous service and attain high-level security.

SUMMARY OF INVENTION

Problems to be Solved by the Invention

However, when RAID and backup software programs are used together, the backup software programs cannot distinguish file systems virtualized by RAID from usual file systems. Even if the file systems on RAID contain access histories and/or metadata in database, the backup software program cannot use the information in that database for backup processing. Thus, the backup software program was forced to process RAID file systems in the same way as usual file systems, making the backup processing inefficient.

Therefore, the present invention aims to solve this problem by constructing a virtual file system by combining multiple storage devices as RAID and letting the backup processor use metadatabase of that virtual file system, providing a file management system and a file management method that can perform backup efficiently.

Means for Solving the Problem

The present invention aims to solve the aforementioned problems, having the following characteristics.

(Claim 1)

The invention of Claim 1 has the following characteristics.

Namely, the file management system of Claim 1 controls multiple storage devices, and comprises a virtual drive controller which controls virtual drives composed of an arbitrary set of the storage devices; a metadatabase which contains the information to associate virtual files on the virtual drives with physical files stored in the storage devices; a backup controller which manages backups of files stored in the virtual drives; and a backup status management database which is used to manage backup processes performed by the backup controller; wherein the virtual drive controller registers information about updated files to the backup status management database; and the backup controller performs backup referring to the backup status management database and the metadatabase.

(Claim 2)

The invention of Claim 2 has the following characteristics in addition to those of Claim 1 described above.

Namely, the backup controller performs backup, triggered by file update events.

(Claim 3)

The invention of Claim 3 has the following characteristics in addition to those of Claim 1 or Claim 2 described above.

Namely, the virtual drive controller controls a master virtual drive which users operate and a backup virtual drive which backs up data in the master virtual drive.

(Claim 4)

The invention of Claim 4 has the following characteristics in addition to those of Claim 1, Claim 2 or Claim 3 described above.

Namely, the backup controller monitors a load of file management servers composing the file management system and postpones the backup process, when the load is greater than a predetermined threshold.

(Claim 5)

The invention of Claim 5 has the following characteristics in addition to those of Claim 1, Claim 2, Claim 3 or Claim 4 described above.

Namely, the virtual drive controller restores files by obtaining backup files corresponding to files with errors, referring to the metadatabase, when file access errors occur.

(Claim 6)

The invention of Claim 6 has the following characteristics in addition to those of Claim 5 described above.

Namely, the virtual drive controller's restoration includes the backup controller's creating recovery files by copying the backup files and the virtual backup controller's updating the links to the files with errors to the links to the recovery files, rewriting the metadatabase.

(Claim 7)

The invention of Claim 7 has the following characteristics in addition to those of Claim 1, Claim 2, Claim 3, Claim 4, Claim 5 or Claim 6 described above.

Namely, a storage recovery controller which performs storage recovery to recover data managed in storage devices where an error occurs is provided, wherein the storage recovery controller, in performing storage recovery, obtains copy data of the data contained in the storage device where the error occurs, copies the copy data to other storage devices composing the same virtual drives as the ones that include storage devices where the error occurs, and rewrites the link information in the metadatabase.

(Claim 8)

The invention of Claim 8 has the following characteristics in addition to those of Claim 1, Claim 2, Claim 3, Claim 4, Claim 5, Claim 6 or Claim 7 described above.

Namely, a system initialization controller which performs system recovery process to restore the system from the backup data is provided, wherein the metadatabase has a master metadatabase and a backup metadatabase, and the system initialization controller, in performing the system recovery process, obtains the backed-up files, based on the backup metadatabase to copy backed-up files.

(Claim 9)

The invention of Claim 9 has the following characteristics.

Namely, a file management method of Claim 9 controls multiple storage devices, and comprise composing a virtual drive with an arbitrary set of the storage devices; registering virtual files and physical files stored in the storage devices in a metadatabase, while associating the virtual files and the physical files; registering information about the updated files in a backup status management database; and performing file backup, referring to the backup status management database and the metadatabase.

(Claim 10)

The invention of Claim 10 has the following characteristics in addition to those of Claim 9 described above.

Namely, performing backup of the files is triggered by file update events.

(Claim 11)

The invention of Claim 11 has the following characteristics in addition to those of Claim 9 or Claim 10 described above.

Namely, composing the virtual drive further comprises composing a master virtual drive which users operate; and composing a backup virtual drive which backs up data in the master virtual drive.

(Claim 12)

The invention of Claim 12 has the following characteristics in addition to those of Claim 9, Claim 10 or Claim 11 described above.

Namely, backing up the file is postponed when the load of file management servers comprising the file management system is greater than a predetermined threshold.

(Claim 13)

The invention of Claim 13 has the following characteristics in addition to those of Claim 9, Claim 10, Claim 11 or Claim 12 described above.

Namely, the file management method further comprises recovering files by obtaining backup files corresponding to files with errors, referring to the metadatabase, when file access errors occur.

(Claim 14)

The invention of Claim 14 has the following characteristics in addition to those of Claim 13 described above.

Namely, recovering the files further comprises creating recovery files by copying the backup files and updating the link to the files where the error occurs to the link of the recovery files by re-writing the metadatabase.

(Claim 15)

The invention of Claim 15 has the following characteristics in addition to those of Claim 9, Claim 10, Claim 11, Claim 12, Claim 13 or Claim 14 described above.

Namely, the file management method further comprises accepting execution of storage recovery process recovering data managed in storage devices where errors occur, updating link information in the metadatabase, while, in the storage recovery process, obtaining data contained in the storage devices and copying the data to other storage devices which compose the same virtual drive.

(Claim 16)

The invention of Claim 15 has the following characteristics in addition to those of Claim 9, Claim 10, Claim 11, Claim 12, Claim 13, Claim 14 or Claim 15 described above.

Namely, master metadatabase and a backup metadatabase are provided as the metadatabase, and the file management method further comprises execution of system recovery process recovering the system from the backup, copying for recovery, in the system recovery process, backed-up files by obtaining the backed-up files using the metadatabase.

Advantageous Effect of the Invention

With the invention of Claim 1 and Claim 9 as described above, as files are backed up using the backup status database and the metadatabase, the backup processor can utilize the metadatabase of the virtual file system, improving backup efficiency.

In addition to that, since the backup status database manages incremental backup in real time, updated files can be detected just by checking the backup status database. Namely, since incremental update management of comparing to historical backup data is not necessary, more rapid process is possible. With traditional backup software programs, all data must be read in the aforementioned incremental update management process, so the backup had to be done during off-peak hour, such as midnight, by scheduling the time to run the batch programs. In comparison, with the present invention, incremental data can be detected without reading all data, so more flexible operation is possible, for example, doing backup during the daytime.

With the invention of Claim 2 and Claim 10 described above, backup processes will be performed, triggered by file update events. With this method, backup can be performed in real time.

With the invention of Claim 3 and Claim 11 described above, master virtual drives to be operated by users and backup virtual drive for backing up the date in the master virtual drives are provided. Namely, since the master virtual drives and the backup virtual drives are managed by the same virtualization method, once the backup virtual drives are instantiated (mounted), the backup data can be provided to the users instantly, without restoring the backup data on the backup virtual drives to the master virtual drives.

With the invention of Claim 4 and Claim 12 described above, file backup processes will be postponed, when the load of the file management servers managing the file management system goes beyond the predetermined threshold. Thus, side effects (such as errors and performance degradation) in backing up can be minimized.

With the invention of Claim 5 and Claim 13 described above, the files are restored by means of obtaining the backup files corresponding to files with errors, by referring to the metadatabase, when file access errors occur. Namely, triggered by an error on a virtual drive's accesses to a physical storage drive, files can be restored without an intervention of the system administrator. In addition, since only files with access errors can be selected for restoration, recovery time can be shortened, and user wait time can be minimized.

With the invention of Claim 6 and Claim 14 described above, the aforementioned file restoration process contains a step to create a recovery file by copying the backup file and a step to update the link to the error file into the link to the recovery file by updating the metadatabase. Therefore, the virtual drive can be accessed transparently, so impact to end users who do not try to access files with errors can be minimized.

With the invention of Claim 7 and Claim 15 described above, a storage recovery process is performed in order to recover the data on a storage device with an error. This storage recovery process obtains data copies of the data contained in the storage device, copies that data to another storage composing the same virtual device as the one the storage device with an error belongs to, and re-write the link information in the metadatabase. Thus, when an error occurs on a specific storage device in the storage group comprising a virtual drive, a whole virtual drive does not have to be recovered, making efficient and fast recovery possible by recovering only files in the storage devices with errors from the backup, limiting the files to be backed up. Thus, recovery waiting time of the users who try to access to the storage device with an error is shortened. Besides, since the virtual drives can be transparently accessed during recovery, impact to the users who do not try to access the storage drive with an error can be eliminated.

Moreover, even when a storage drive with an error is detached from the server, files are automatically recovered to a free space of the virtual drive from the backup data, so a manual recovery operation by the system operator is not necessary and there is no need to salvage the data from the storage drive with an error, enabling that storage drive to be detached instantly.

With the invention of Claim 8 and Claim 16 described above, a master metadatabase and a backup metadatabase are provided as the metadatabase, and a system recovery process is performed to recover the system from the backup data. Here, the system recovery process obtains the backup files based on the backup metadatabase, and copies the backup file for recovery. Namely, not only backup files but also the master metadatabase with configuration information can be restored from the backup. Therefore, even when an unrecoverable error such as a loss of servers happens, the status of the virtual drive can be recovered from the backup data.

Besides, when the user send a read request to the data of which the system recovery process is not yet complete, the recovery process of that data can be given a high priority, ensuring transparent accesses to the virtual drive during the system recovery process.

BRIEF DESCRIPTION OF DRAWINGS

FIG. 11 This is an example of a metadatabase.

DESCRIPTION OF EMBODIMENTS

Embodiments of the present invention will be described below with reference to drawings.

Figure 1:
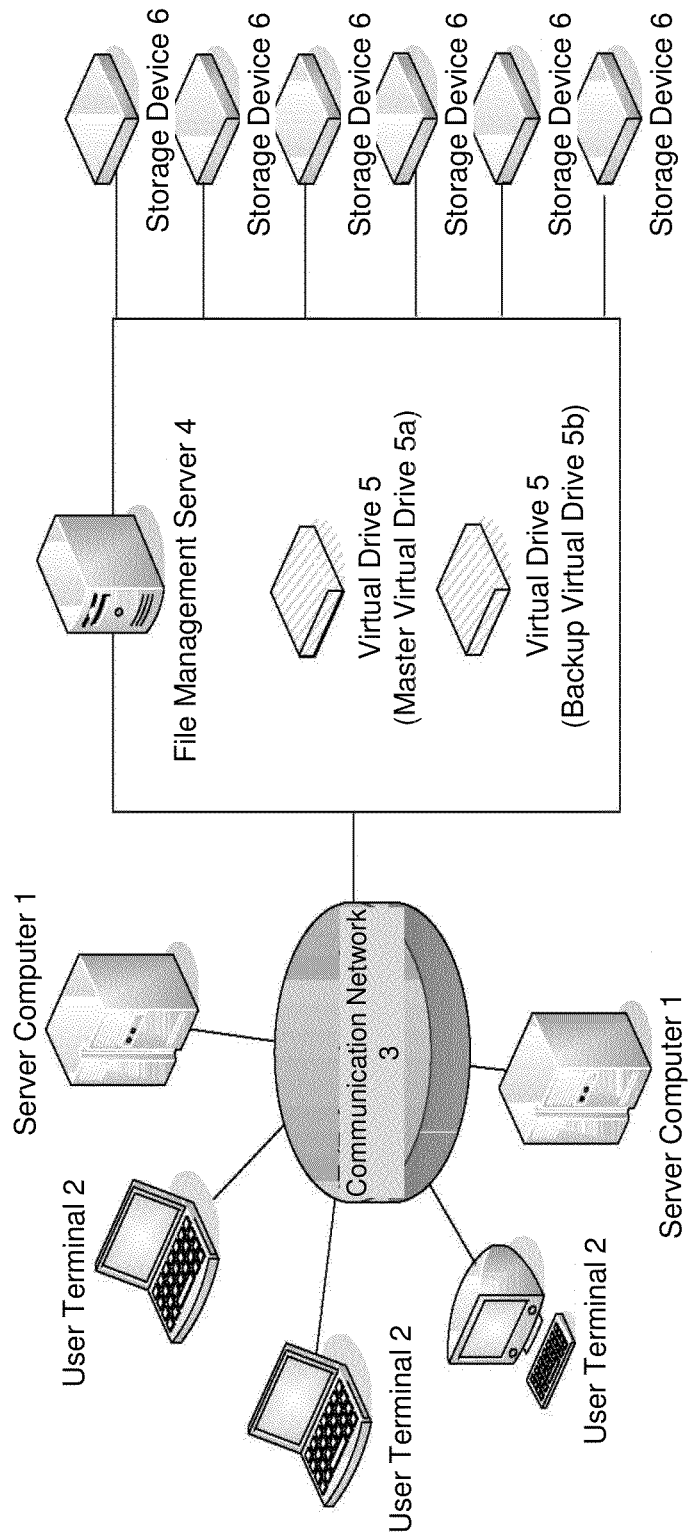
FIG. 1 This is a figure depicting the environments of an embodiment of a file management system.

A file management system in an embodiment of the present invention controls multiple storage device 6. This file management system used to manage files via communication network 3, as an example shown in FIG. 1. In the example shown in FIG. 1, at least one server computers 1 and at least one user terminals 2 are connected to a file management server 4 that provides a file management system.

More than one storage devices 6 are connected to the file management server 4. The file management server 4 formats and mounts these storage devices 6, providing virtual drive 5 functionality by enabling files in the storage devices 6 to be seen as a virtual tree structure.

In this embodiment, two virtual drives 5, namely a master virtual drive 5a and a backup virtual drive 5b are provided. The master virtual drive 5a is a drive that can be operated by users via the communication network 3. In comparison, the backup virtual drive 5b is a backup of the master virtual drive 5a, holding the replicated version of the data in the master virtual drive 5a. Generally, this backup virtual drive 5b is not directly operated by users.

With this file management system, the users (i.e. server computers 1 and user terminals 2) accessing the file management server 4, can access files on the virtual drive 5 (more precisely, the master virtual drive 5) by specifying a file path, without being concerned which storage device 6 physical files are stored on. The file management server 4 replies a response to the user, when it receives an access request to the virtual drive 5 from the user.

In this embodiment, the following explanation is based on the assumption that storage devices 6 are hard disk drives. However, a storage device 6 does not have to be a hard disk drive. It can be any permanent memory device such as SSD (Solid State Drive) or USB-connected flash memory; NAS (Network Attached Storage) or DAS (Direct Attached Storage) connected via Ethernet; SAN (Storage Area Network) connected via Fibre Channel; or, a cloud storage server on the Internet.

Figure 2:
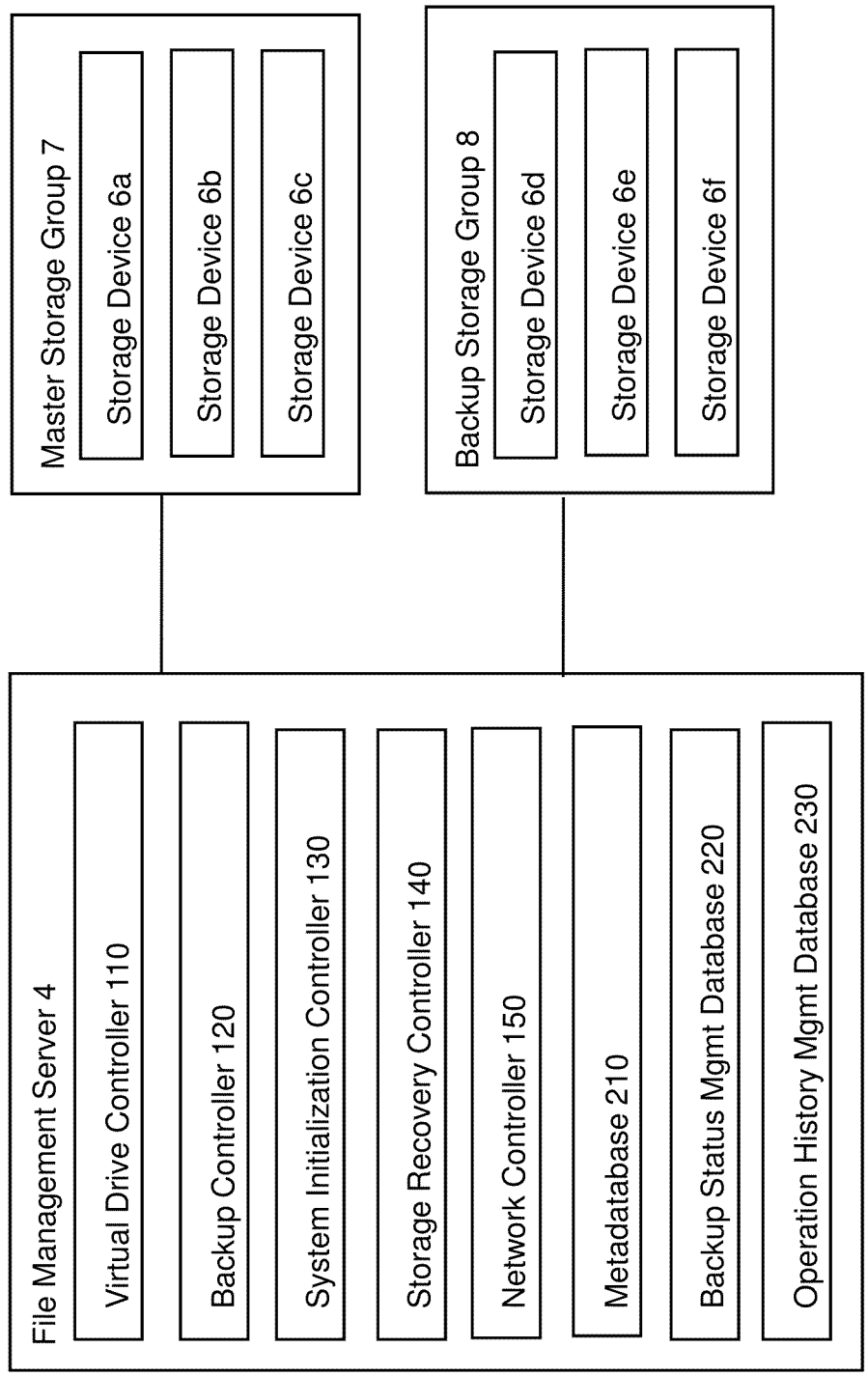
FIG. 2 This is a block diagram depicting functions of an embodiment of the file management system.

FIG. 2 is a block diagram depicting an embodiment of the file management system.

As shown in FIG. 2, more than one storage devices 6 are connected to the file management server 4. In this embodiment, six storage devices 6, namely storage device 6a, 6b, 6c, 6d, 6e, and 6f are connected, with 6a, 6b, and 6c assigned to a master storage group 7 and 6d, 6e, and 6f assigned to a backup storage group 8. The master storage group 7 comprises a master virtual drive 5a to be operated by users, and the backup storage group 8 comprises a backup virtual drive 5b to which the data in the aforementioned master virtual drive 5a is backed up. A virtual drive controller 110 explained below controls this master virtual drive 5a and this backup virtual drive 5b.

As shown so far, in this embodiment, the master virtual drive 5a and the virtual drive 5b are controlled by the virtual drives 5 with the same method, it is possible to restore the backup data instantly and provide the users with the data, once the virtual drive 5b is instantiated (mounted).

The aforementioned configuration of the virtual drives 5 is only an example; the administrator of the file management server 4 can arbitrarily configure the virtual drives 5. For example, the administrator may configure more than one master virtual drives 5a and backup virtual drives 5b, and arbitrary number of storage devices 6.

Since the size of the area on the storage device 6 allocated to the virtual drive 6 is arbitrary, only a partial area of the storage device 6 can be allocated to the specific virtual drive 5. Therefore, it is technically possible to allocate one area of the storage device 6 to the master virtual drive 5b and allocate another area of the same storage device 6 to the backup virtual drive 5b. With this type of allocation, however, when an error occurs on the storage device 6, the master and the backup might be inoperable at the same time. Therefore, the storage device 6 allocated to the master virtual drive 5a and the storage device 6 allocated to the backup virtual drive 5*b* should be physically separated.

A file management server 4 controls the storage devices 6 in the configuration described above; it comprises a virtual drive controller 110, a backup controller 120, a system initialization controller 130, a storage recovery controller 140, a network controller 150, a metadatabase 210, a backup status management database 220, and an operation history management database 230, as shown in FIG. 2.

In this embodiment, it is assumed that the file management server 4 is a single server. However, the virtual drive controller 110, the backup controller 120, the system initialization controller 120, the storage recovery controller 130, the storage recovery controller 140, the network controller 150, the metadatabase 210, the backup status management database 220, and the operation history management database 230 can be distributed across multiple file management servers 4 communicating with each other. Besides, it is possible to make a configuration such that some file management servers 4 manage the master virtual drives 5*a* the other file management servers 4 manage the backup virtual drive 5*b* that backs those master virtual drives 5*a*, with the file management servers 4 communicating to each other.

(Virtual Drive Controller 110)
A virtual drive controller 110 controls the aforementioned master virtual drives 5*a* and backup virtual drives 5*b*.

The virtual drive controller 110 searches physical files on storage devices 6 and send them in response to file access requests from users. It also updates files and register update history in the operation history management database 230, in response to file update requests from users. Besides, it performs recovery process using backup files, when a file access error occurs.

(Backup Controller 120)
A backup controller 120 manages the backup of files stored in the aforementioned master virtual drive 5*a*.

This backup controller 120 creates backups of the files stored on the master virtual drive 5*b* onto the backup virtual drive 5*b* by regularly performing backup processes.

(System Initialization Controller 130)
A system initialization controller 130 performs system initialization process.

When a new file management system is created, the system initialization controller 130 performs system initialization, according to the configuration set up by the system administrator. In addition, the system initialization controller 130 performs a system recovery process that can restore the system from the backup data, when an unrecoverable error, such as a loss of the servers, occurs to the master virtual drive 5*a*.

(Storage Recovery Controller 140)
A storage recovery controller 140 performs a storage recovery process to restore the data managed in storage devices 6 with an error. In the storage recovery process, as the storage device 6 with an error is detached, the same corresponding data (backup data or the original data of the backup data) as the data stored on that storage device 6 with an error is copied to another storage device 6 without an error. With this storage recovery process, even when a storage device 6 comprising the virtual drive 5 is detached, data redundancy is ensured automatically.

(Network Controller 140)
A network controller 140 controls input and output of files managed by the virtual drives 5.

The network controller 150 receives file access requests from outside the communication network 3, sends them to the virtual drive controller 110, and sends the files to outside the communication network 3 in response to the instructions from the virtual drive controller 110.

(Metadatabase 210)
A metadatabase 210 is a database that contains information to associate virtual files on the virtual drive 5 with physical files stored on the storage device 6.

As shown in FIG. 11, the metadatabase 210 contains information such as a file ID, a virtual path (a path on the virtual drive 5), a physical path (a path on the storage device 6), a file name, a file size, and an update date, for each of the files.

As shown in FIG. 11, the metadatabase 210 consists of a metadatabase 210*a* for the master virtual drive 5*a* and a metadatabase 210*b* for the backup virtual drive 5*b*.

The metadatabase 210*a* for the master virtual drive 5*a* manages the files in the master virtual drive 5*a*, containing paths on the master virtual drive 5*a* as virtual paths to each file information. It also contains paths on the master storage group 7 as physical paths of each file information.

The metadatabase 210*b* for the backup virtual drive 5*b* manages the files in the backup virtual drive 5*b*, containing paths on the backup virtual drive 5*b* as virtual paths as virtual paths to each file information. It also contains paths on the backup storage group 8 as physical paths of each file information.

The metadatabase 210*a* for the master virtual drive 5*a* and the metadatabase 210*b* for the master virtual drive 5*b* are linked by way of file IDs, thus associating master data with backup data. For example, if there is an file with a specific file id the metadatabase 210*a* for the master virtual drive 5*a* (for example, "1"), a file with the same id ("1") in the metadatabase 210*b* for the virtual drive 5*b* is the backup data of the former file. Thus, in order to find the backup file corresponding to a specific master file, one can search the metadatabase 210*b* for the backup virtual drive 5*b* using the file ID of the master file as a key. Similarly, in order to find the master file corresponding to a specific backup file, one can search the metadatabase 210*a* for the master virtual drive 5*a* using the file id of the specific backup file as a key.

The metadatabase 210 can contain other data than what was mentioned so far, such as file creation dates, access dates, file attributes, and access right information.

(Backup Status Management Database 220)
A backup status management database 220 is a database that can be used to manage backups by the backup controller 120.

When files that are not yet backed up are registered in the backup status management database 220, the backup controller 120 refers that registered information, and necessary backup processes will be performed.

(Operation History Management Database 230)
An operation history management database 230 manages the history of users' operation to files.

As shown before, when the virtual drive controller 110 updates files, that update history is recorded to the operation history management database 230. Then, the virtual drive controller 110 regularly checks the operation history management database 230, recording the files that must be backed up into the backup status management database 220.

Thus, only updated files are recorded as targets for backup.
(Explanation of Each Process)
Each process the file management system of this embodiment performs will be explained below.

(File Access Process)
Firstly, a file access process of this embodiment is explained. In this explanation, an example that any of user terminals 2 in FIG. 1 access the files stored in the virtual drive 5 is used.

At first, the file management server 4 receives a file access request from the user terminal 2 across the communication network 3. Here, a target file is specified with a directory path on the virtual drive 5 (e.g. "V:¥SomeFolder¥file_a").

The virtual drive controller 110 receives this file access request via the network controller 150.

The virtual drive controller 110 searches in the metadatabase 210a for the master virtual drive 5a using the received directory path on the virtual drive 5 ("V:¥SomeFolder¥file_a") as a key, and retrieves the file information having the matching key.

The virtual drive controller 110 reads a physical file stored on the storage device 6 using the physical path (the path on the storage device 6) contained in the retrieved file information, and sends that files to the user terminal 2 via the network controller 150 and the communication network 3.

(File Update Process)

A file update process in this embodiment will be explained below, referring to FIG. 3.

In this embodiment, the virtual drive controller 110 performs a file update process, triggered by reception of a file update request from the user terminal 2 across the communication network 3.

Figure 3:
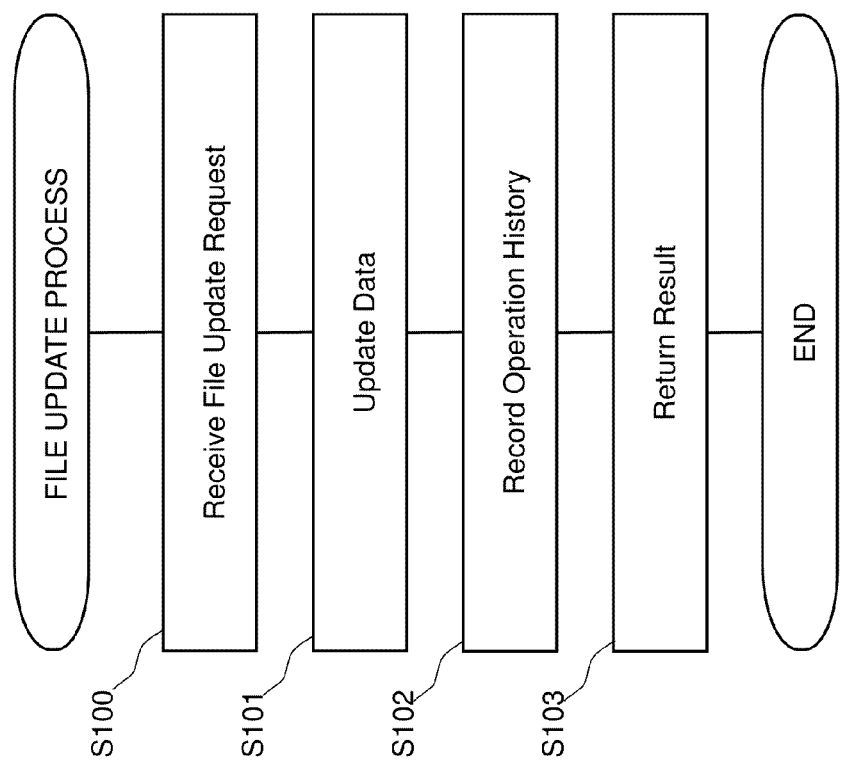
FIG. 3 This is a flow chart of an embodiment of a file update process.

In the step S100 in FIG. 3, the file management server 4 receives data sent by the user terminal 2 via the network controller 150. This data contains binary data of the updated files and a directory path on the virtual drive 5 (e.g. "V:/SomeFolder/file_a"). Then, the step s101 is executed.

In the step S101, the virtual drive controller 110 searches the metadatabase 210a for the master virtual drive 5a using the received directory path on the virtual drive 5 ("V:/SomeFolder/file_a") as a key, and obtains file information matching to the key. If the virtual path (the path on the virtual drive 5) contained in the obtained file information is the same as the path send by the user terminal 2, the virtual drive controller 110 interprets the request from the user terminal 2 is overwrite-update, and overwrites the physical file of the path of the storage device 6 with new binary data sent from the user terminal. Then, the step S102 is executed.

In the step S102, the file management server 4 records the file ID of the updated file into the operation history management database 230. Then, the step S103 is executed.

In the step S103, a file update completion notice is sent to the user terminal 2 via the network controller 150, letting the user know that file update process is completed. Then, the file update process finishes.

(Backup Registration Process)

A backup registration process in this embodiment will be explained below, referring to FIG. 4.

In this embodiment, the virtual drive controller 110 performs backup registration process, which is a process to register files to be backed up.

Figure 4:
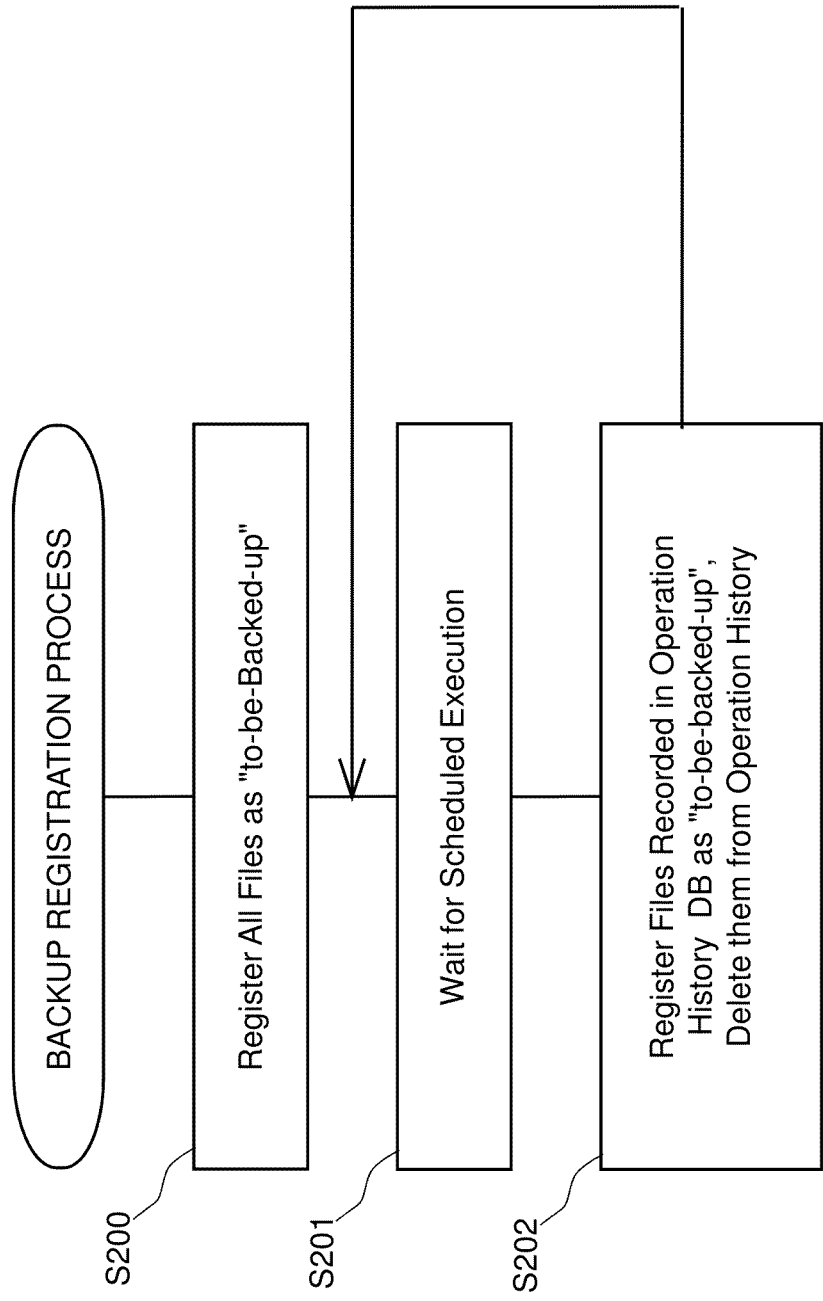
FIG. 4 This is a flow chart of an embodiment of a backup registration process.

In the step S200 in FIG. 4, the virtual drive controller 110 registers all the files managed by the master virtual drive 5a into the backup status management database 220, as the files "to-be-backed-up". That is, since there are no backup files initially, all the files are registered as "to-be-backed-up" to perform a full backup. Then, the step S201 is executed.

In the step S201, the virtual drive controller 110 waits until a predetermined wait time expires. Then, the step S202 is executed.

In the step S202, as the predetermined wait time expires, a periodical backup registration process is executed. Here, the virtual drive controller 110 obtains file IDs registered in the operation history management database 230, and registers or updates the data that corresponds to those file IDs on the backup status management database 220 as "to-be-backed-up". Then, the step S201 is performed, and the process waits until the predetermined wait time expires again (that is, waits until next periodical execution time).

(Backup Process)

A backup process in this embodiment is explained below, referring to FIG. 5.

The backup process in this embodiment is performed by the backup controller 120 periodically at predetermined execution time windows.

These process time window can be set arbitrarily by the system administrator and the like. Specific time of specific days (for example, from the midnight to 5 AM on weekdays) can be specified for the backup execution. This execution time window can be set to all of the time slots, which means the backup process is always executed, making real-time backup possible.

Figure 5:
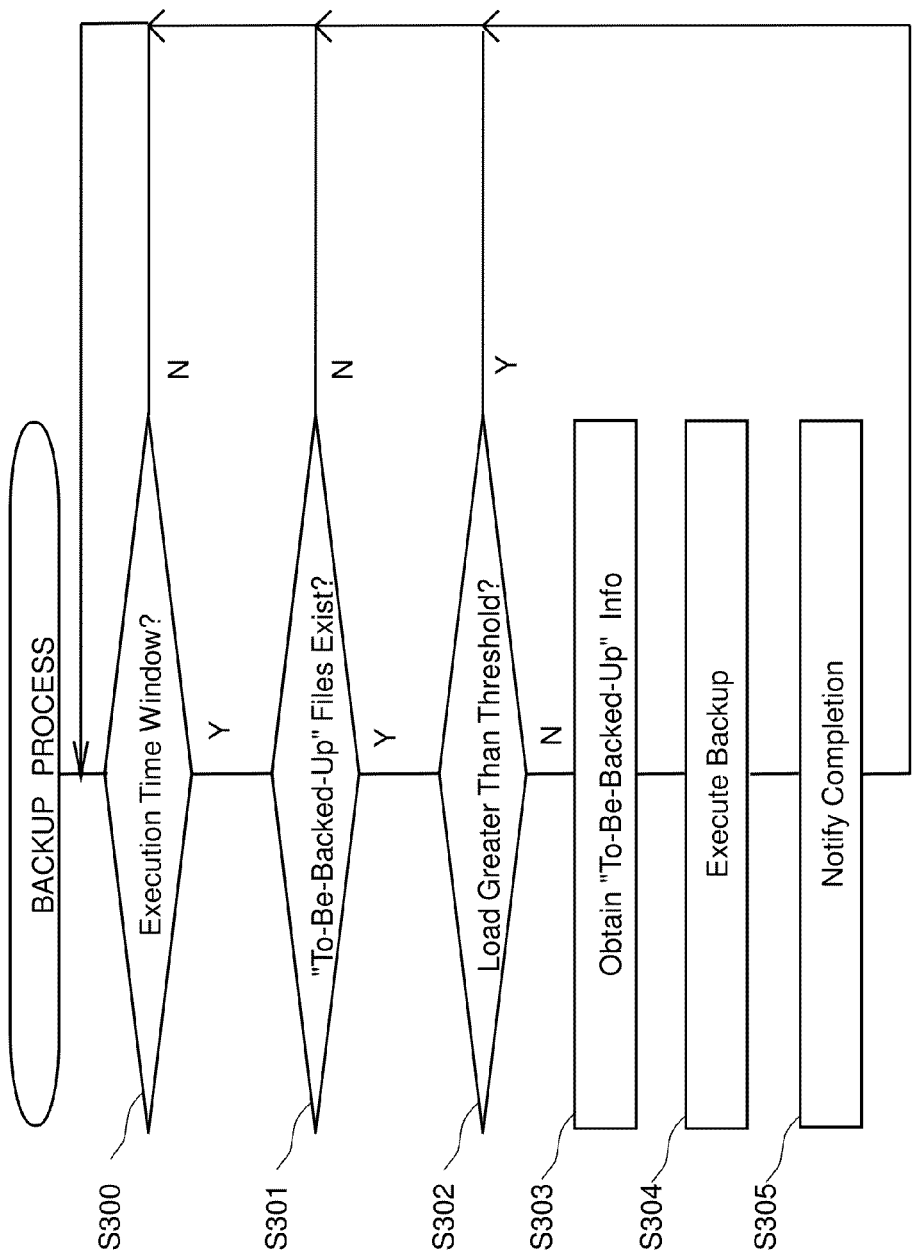
FIG. 5 This is a flow chart of an embodiment of a backup process.

In the step S300 in FIG. 5, the current time is checked if it is within the predetermined execution time windows. If it is within the execution time windows, the step S301 is executed, otherwise the step S300 is executed, the process waiting until the next predetermined execution time window.

In the step S301, the backup status management database 220 is read and checked if there are any files registered as "to-be-backed-up". If there are any files registered as "to-be-backed-up", the step S302 is executed. If there are no files registered as "to-be-backed-up", the step S300 is executed again.

In the step S302, the backup controller 120 monitors the load (for example, CPU utilization, memory usage, disk I/O and/or network I/O) of the file management server 4, and checks if it is greater than the predetermined threshold (for example, 50% of CPU utilization, 1 GB of memory usage, 10 Mbps of disk I/O, 10 Mbps of network I/O). If it is greater, the step S300 is executed. If not, the step S303 is executed.

In the step S303, the backup controller 120 searches the metadatabase 210a for the master virtual drive 5a using the file information (such as file IDs) registered in the backup status management database 220 as "to-be-backed-up" as a key, and obtains a link information (such as URLs) to access the physical files corresponding to those "to-be-backed-up" files. Then, the step S304 is executed.

In the step S304, the backup controller 120 accesses the physical files using the link information obtained in the step S303, and creates backup of these physical files. The backup is stored in any of the storage devices 6 in the backup storage group 8; the virtual drive controller 110 determines which storage device 6 to be used, based on factors such as usage of each of the storage devices 6. Then, the step S305 is executed.

In the step S305, the backup controller 120 notifies the virtual drive controller 110 that the backup process is completed. Here, the file IDs of the files for which the backup process is completed is sent. The virtual drive controller 110, as it receives this backup completion notice, obtains the data in the backup status management database 220 about the files whose backup completed, and changes the status of that data from "to-be-backed-up" to "backup-completed". In addition, the virtual drive controller 110 updates the metadatabase 210b for the backup virtual drive 5b to associate the original files with the backup files.

Here, if a received file ID is not found in the metadatabase 210b for the backup virtual drive 5b (i.e. the first time backup), a new file ID data is created, and registered in the metadatabase 210b for the backup virtual drive 5b. In contrast, if the received file ID is found on in the metadatabase 210b for the backup virtual drive 5b (i.e. overwriting backup), the physical path of that data is re-written as necessary. If the physical path is not changed, there is no need to re-write it.

Then, the step S300 is executed; this process is repeated until the predetermined execution window ends. Thus, in a predetermined execution time window, the backup process continues as long as there remain "to-be-backed-up" files.

As described above, the backup process in this embodiment performs backup using the backup status management database 220 and the metadatabase 210, so backup processors can use the metadatabase 210 of virtual file systems, enabling an efficient backup.

Besides, since the backup status management database 220 manages differential data in real time, updated files can be detected using only the backup status management database 220. In other words, comparison with backup data is not necessary, reducing process time. With traditional backup programs, this difference comparison process involves reading of all data, which necessitates "timed batch execution" during midnight, avoiding operational hours with higher system load. In comparison, in this embodiment, file difference information can be obtained with lower system load without reading all the data, resulting in a flexible operation, such as executing backup during the daytime.

Also, when the load of the file management server 4 is greater than the predetermined threshold, the file backup process is held, so an effect of executing backup (such as errors and performance degradation) to the virtual drive 5 can be minimized.

(Recovery Process)

A recovery process in this embodiment is explained below. The recovery process in this embodiment is executed by the virtual drive controller 110, and recovers files by referring to the metadatabase 210 and obtaining the backup files that correspond to the error files, when a file access error occur.

Figure 6:
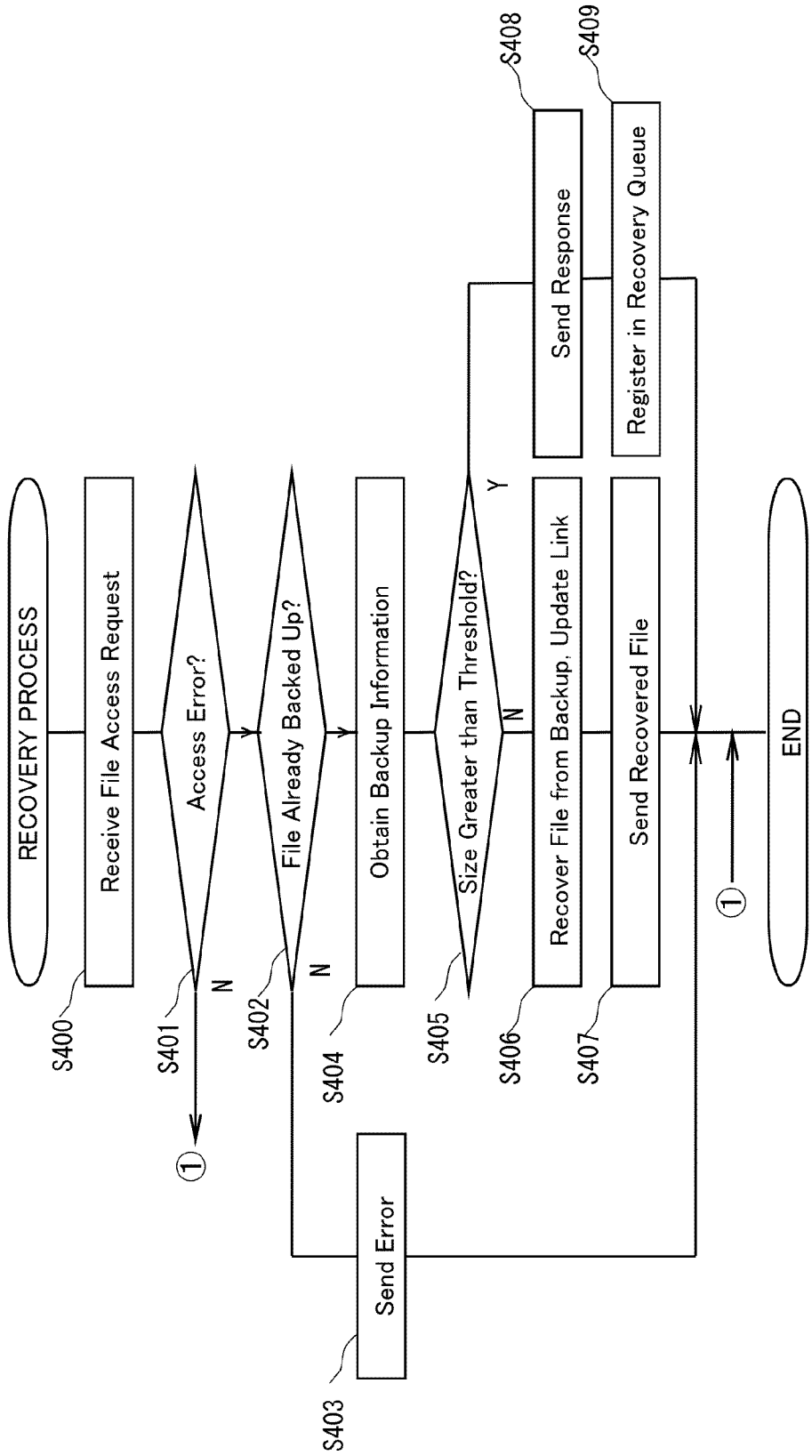
FIG. 6 This is a flow chart of an embodiment of a recovery process.
Figure 7:
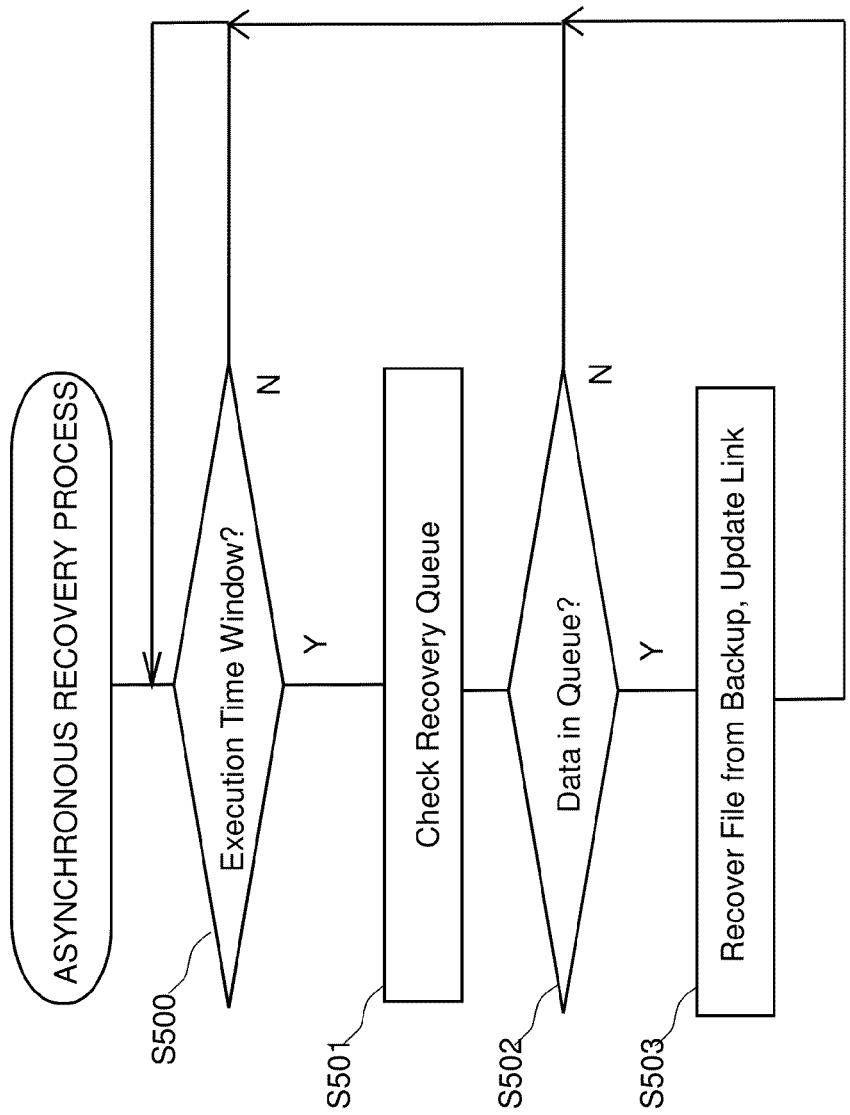
FIG. 7 This is a flow chart of an embodiment of an asynchronous backup process.

This recovery process is explained, referring to FIG. 6 and FIG. 7.

In the step S400 in FIG. 6, the file management server 4 receives a file access request from the user terminal 2 via the communication controller 150. Then the step S401 is executed.

In the step S401, the virtual drive controller 110 searches the metadatabase 210a for the master virtual drive 5a, using the directory path contained in the file access request as a key, and obtains the file information matching the key. The virtual drive controller 110 accesses a physical file stored on the storage device 6 using the physical path (the path on the storage device 6) contained in the obtained file information. Here, if a file access error occurs, the step S402 is executed where a recovery process is executed. On the contrary, if there is no file access error, the virtual drive controller 110 sends the accessed physical file to the requesting user terminal 2 and finishes execution.

In the step S402, the virtual drive controller 110 reads the backup status management database 220 and check if the file with an error is already backed up. If it is already backed up, the step S404 is executed. On the contrary, if the latest version is not backed up, the step s403 is executed, where an error message is sent to the requesting user terminal 2, and an execution is finished.

In the step S404, the virtual drive controller 110 reads the metadatabase 210 and obtains data about a backed-up physical file (a backup file). Specifically, it searches the metadatabase 210b for the backup virtual drive 5b using the file ID of the file where a file access error occurred as a key, and obtains the physical path of the backup file. Then, the step S405 is executed.

In the step S405, it is checked whether the size of the file to be recovered is greater than the threshold. If the file size is smaller than the threshold, the step S406 is executed, where a recovery process is performed synchronously. If the file size is greater than or equal to the threshold, the step S408 is executed, where a recovery process is performed asynchronously.

When the recovery process is performed synchronously, in the step S404, a recovery file is created by copying the backup file based on its physical path obtained in the step S404. Any storage device 6 comprising the storage group 7 can be a restoration target; the virtual drive controller 110 determines which storage device 6 it stores the backup based on factors such as utilization of each storage device 6. After restoration, it re-writes the link information in the metadatabase 210a for the master virtual drive 5a, linking the directory path on the virtual drive 5 that originates an file access error (the directory path on the virtual drive 5 contained in the file access request that the user terminal 2 sends in the step S400) to the restored physical file. Namely, it updates the physical path in the file information about the file with an error, making it be the physical path of the restored file. Then, the step S407 is executed.

In the step S407, the virtual drive controller 110 sends the recovered physical file to the requesting user terminal and finishes execution.

In contrast, when recovery is done asynchronously, in the step S408, the physical file data obtained in the step S404 is sent to the user terminal 2. Here, since this physical file is sent as read-only, an error is sent if the request from the user terminal 2 is a write access. Then, the step S409 is executed.

In the step S409, the file information about the file access error is registered in the recovery queue so that it is to be processed by the asynchronous recovery process later.

FIG. 7 is a diagram depicting the asynchronous recovery process. This asynchronous recovery process is provided so that when the files to be recovered are large, the recovery process can be done at a later time, improving user response time.

In the asynchronous recovery process, it is determined if the current time is within the predetermined execution time window, in the step S500 in the FIG. 7, If it is within the time window, the step S501 is executed. If it is not within the time window, the step S500 is executed again to wait for the next predetermined execution time window. Here, the execution time windows for asynchronous recovery processes can be arbitrarily set up by the system administrator, as those for backup processes. Then, the step S501 is executed.

In the step S501, the virtual drive controller 110 reads the recovery queue. Then, the step S502 is executed.

In the step S502, it is checked if there is data registered in the recovery queue. If there is data registered in the recovery queue, the step S502 is executed. If there is no data registered in the recovery queue, the step S500 is executed again.

In the step S503, the virtual drive controller 110 reads the metadatabase and obtains the physical paths of the backed-up physical file data (backup files) using the data registered in the recovery queue. Specifically, it searches the metadatabase 210b for the backup virtual drive 5b with the file ID registered in the recovery queue as a key, and obtains the physical path of the backup file. Then, it creates a recovery file, copying the backup file using the obtained physical path. Any storage device 6 comprising the storage group 7 can be a restoration target; the virtual drive controller 110 determines which storage device 6 it stores the backup, based on factors such as utilization of each storage device 6. After restoration, it re-writes the link information in the metadatabase 210a for the master virtual drive 5a, linking the directory path of the virtual drive 5 that originates an file access error (the directory path on the virtual drive 5 contained in the file access request that the user terminal 2 sends in the step S400) to the restored physical file. Namely, it updates the physical path in the file information about the file with an error, making it be the physical path of the restored file. After this restoration creation steps and link update steps are executed for all of the data registered on the recovery queue, the step S500 is executed again.

As described above, with the recovery process in this embodiment, the master virtual drive 5a automatically restores files, triggered by an file access error on the physical storage device 6, so file restoration can be done without the system administrators' intervention.

Besides, in file restoration, the backup files are copied to create recovery files, and then the metadatabase 210 is re-written so that the links to the files with errors is updated to the links to the recovery files; therefore, only files with a file access error are selected for the error recovery process. Thus, the recovery process can be shorter, reducing wait time for the users trying to use the files with errors. Besides, since other files are not impacted during recovery, it is possible to avoid impact to the other users than the users who try to access files with errors.

Here, in the above embodiment, only files with errors were restored, but other files may be restored, too. For example, whole storage device 6 storing the files with errors may be restored in case that storage device itself is malfunctioned.

(Master Storage Recovery Process)

Figure 8:
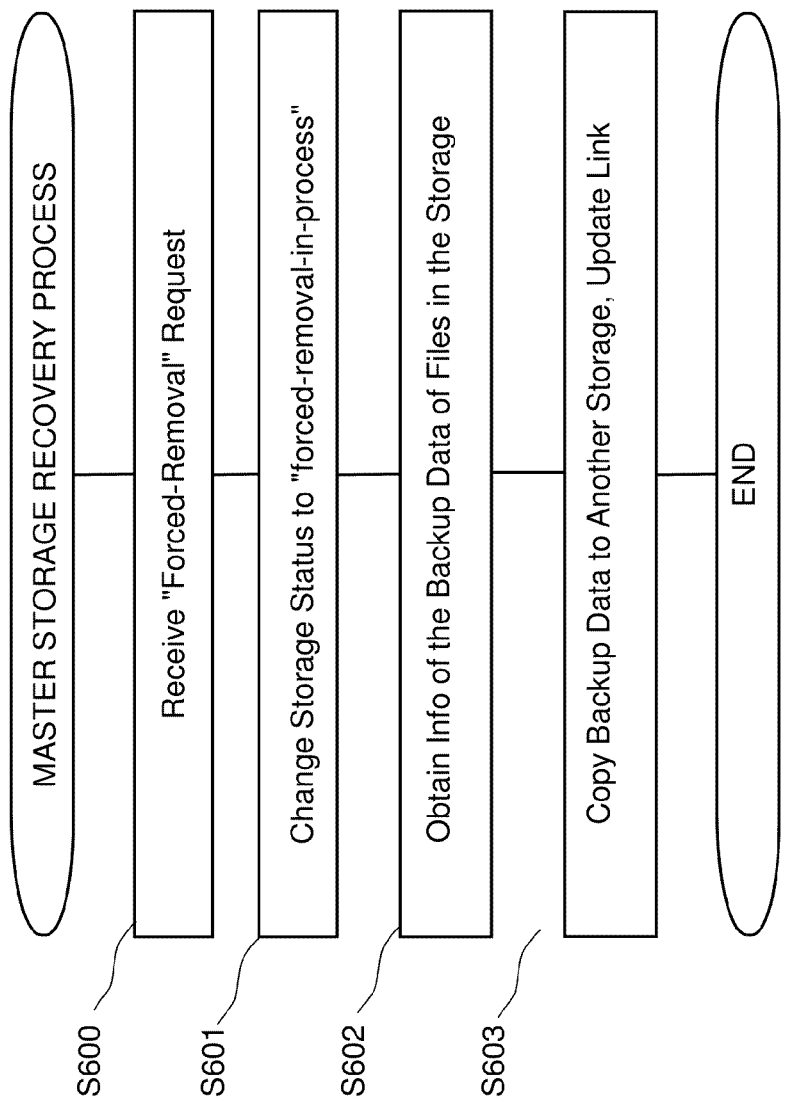
FIG. 8 This is a flow chart of an embodiment of a master storage recovery process.

A master storage recovery process in this embodiment is explained, referring to FIG. 8.

The master storage recovery process in this embodiment, executed by the storage recovery controller 140, recovers the data managed in storage device 6 with errors from its backup data, when an error occurs in the storage device 6 comprising the master storage group 7.

In the step S600 in FIG. 8, the storage recovery controller 140 receives a forced removal request of the storage device 6. This forced removal request is sent, when the system administrator execute an removal operation of the storage device 6. Then, the step 601 is executed.

In the step S601, the metadatabase 210a for the master virtual drive 5a is updated, making the status of the data contained in the storage device 6 to be removed "forced-removal-in-process". Here, if a user tries to access the data contained in a "forced-removal-in-process" storage device 6, the backup data is sent as reference-only or a file access error is sent. Then, the step S602 is executed.

In the step S602, the file information of the files managed in the storage device 6 to be removed is extracted from the metadatabase 210a for the master virtual drive 5a. Since this extracted file information contains the file ID, access information to the backup date is obtained using this file ID. Specifically, the metadatabase 210b for the virtual drive 5b is searched using the file ID as a key, the physical path of the backup file is obtained. Then, the step 603 is executed.

In the step S603, the backup data obtained using the physical path of the backup file is copied to another storage device 6 that composes the same virtual drive 5 (the master virtual drive 5) as the one the to-be-removed storage device composes (that is, one of the storage devices 6 belonging to the master storage group 7).

Then, the link information in the metadatabase 210a for the master virtual drive 5a is re-written so that the data newly copied to the storage device 6 can be accessed. Specifically, the physical path contained in the file information of the copied file is re-written so that it points to the newly copied data.

After the metadatabase 210a for the master virtual drive 5a is re-written, the status "forced-removal-in-process" of that data is turned off. Then, the master storage recovery process finishes.

As explained above, with the master storage recovery process in this embodiment, the data contained in the storage device 6 with an error is obtained; that data is copied to another storage device comprising 6 the master virtual drive 5a; and the link information the metadatabase 210 is updated. Thus, if an error occurs in a specific storage device 6 within the master storage group 7, the master virtual drive 5a does not have to be recovered as a whole, so the recovery can be done efficiently (in short time), by only restoring the files stored in the storage devices 6 where errors occur from the backup. This makes recovery wait time for the users trying to access the storage devices 6 with an error shorter. Besides, since the other files are not impacted during a recovery process, the users other than the ones trying to access the storage devices 6 with an error are not impacted.

Moreover, when the storage device 6 with an error is removed from the server, the target files are recovered automatically from the backup data to free spaces on the master virtual drive 5a; there is no need to salvage data from the storage device 6 with an error, making an instant removal of the device possible.

(Backup Storage Recovery Process)

A backup storage recovery process in this embodiment is explained below, referring to FIG. 9.

The backup storage recovery process in this embodiment is performed by the storage recovery controller 140; when an error occurs in the storage device 6 comprising the backup storage group 8, the data managed by that storage device 6 is recovered from the master data.

Figure 9:
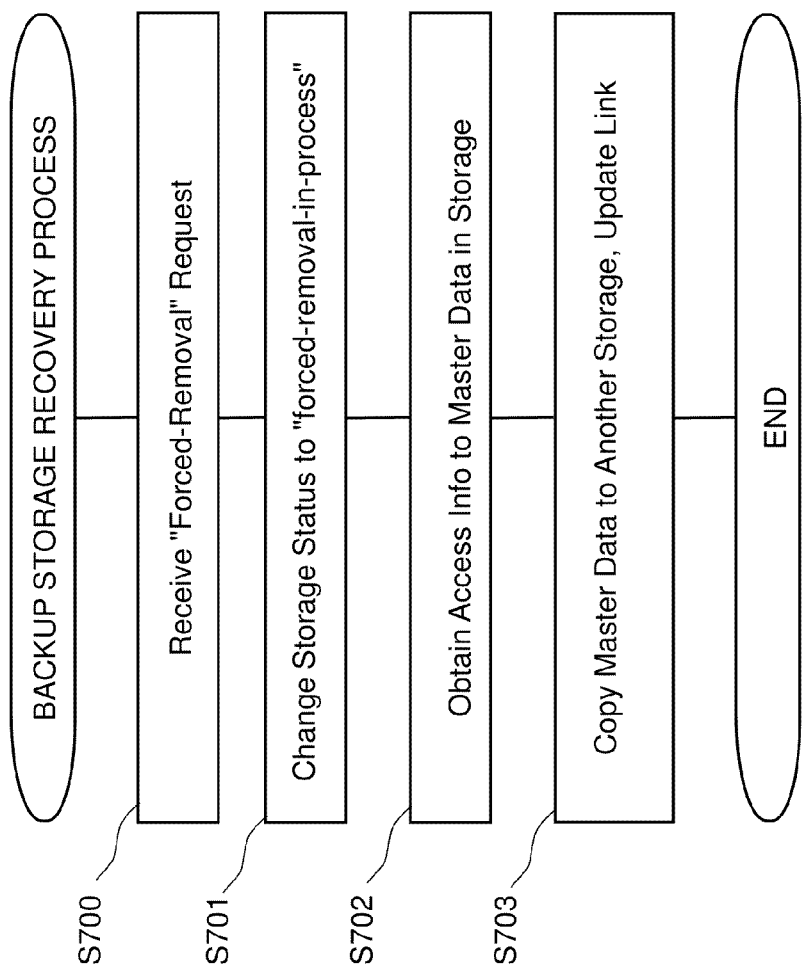
FIG. 9 This is a flow chart of an embodiment of a backup storage recovery process.

In the step S700 shown in FIG. 9, the storage recovery controller 140 receives a forced removal request of the storage device 6. This forced removal request is sent, triggered by the user operation of removing the storage device 6. Then, the step S701 is executed.

In the step S701, the metadatabase 210b for the backup virtual drive 5b is updated so that the status of the data contained in the to-be-removed storage device 6 becomes "forced-removal-in-process". Here, when it is necessary to access the data contained in a "forced-removal-in-process" storage devices, the backup data is sent as reference-only or a file access error is sent. Then, the step S702 is executed.

In the step S702, the file information of the files managed in the to-be-removed storage device 6 is extracted from the metadatabase 210b for the backup virtual drive 5b. Here, since a file ID is contained in the extracted file information, the access information to the master data can be obtained using this file ID. Specifically, the metadatabase 210a for the master virtual drive 5a is searched using the file ID as a key, and the physical path of the master file is obtained. Then, the step S703 is executed.

In the step S703, the master data obtained using the physical path of the master file is copied to another storage device 6 that composes the same virtual drive 5 (the backup virtual drive 5b) as the one the to-be-removed storage device composes (that is, one of the storage devices 6 belonging to the master storage group 8).

Then, the link information in the metadatabase 210b for the backup virtual drive 5b is re-written sp that the data newly copied to the storage device 6 can be accessed. Specifically, the physical path contained in the file information of the copied file is re-written so that it points to the newly copied data.

After the metadatabase 210b for the backup virtual drive 5b is re-written, the status "forced-removal-in-process" of that data is turned off. Then, the backup storage recovery process finishes.

As explained above, with the backup storage recovery process in this embodiment, the data contained in the storage device 6 with an error is obtained; that data is copied to another storage device 6 comprising the backup virtual drive 5b; and the link information the metadatabase 210 is updated. Thus, if an error occurs in a specific storage device 6 within the backup storage group 8, the backup virtual drive 5b does not have to be recovered as a whole, so the recovery can be done efficiently (in short time), by only restoring the files stored in the storage devices 6 where errors occur from the master. This makes recovery wait time for the users trying to access the storage devices 6 with an error shorter. Besides, since the other files are not impacted during a recovery process, the users other than the ones trying to access the storage devices 6 with an error are not impacted.

Moreover, when the storage device 6 with an error is removed from the server, the target files are recovered automatically from the backup data to free spaces on the backup virtual drive 5b; there is no need to salvage data from the storage device 6 with an error, making an instant removal of the device possible.

(System Recovery Process)

A system recovery process in this embodiment will be explained below, referring to FIG. 10.

The system recovery process in this embodiment is executed by the system initialization controller 130. It is the process that recovers the system using the data in the backup virtual drive 5b (actually, the backup storage group 8), when an error risking metadatabase 210a of the master virtual drive 5a to be lost completely (for example, an unrecoverable system crash or database storage failure) occurs.

Figure 10:
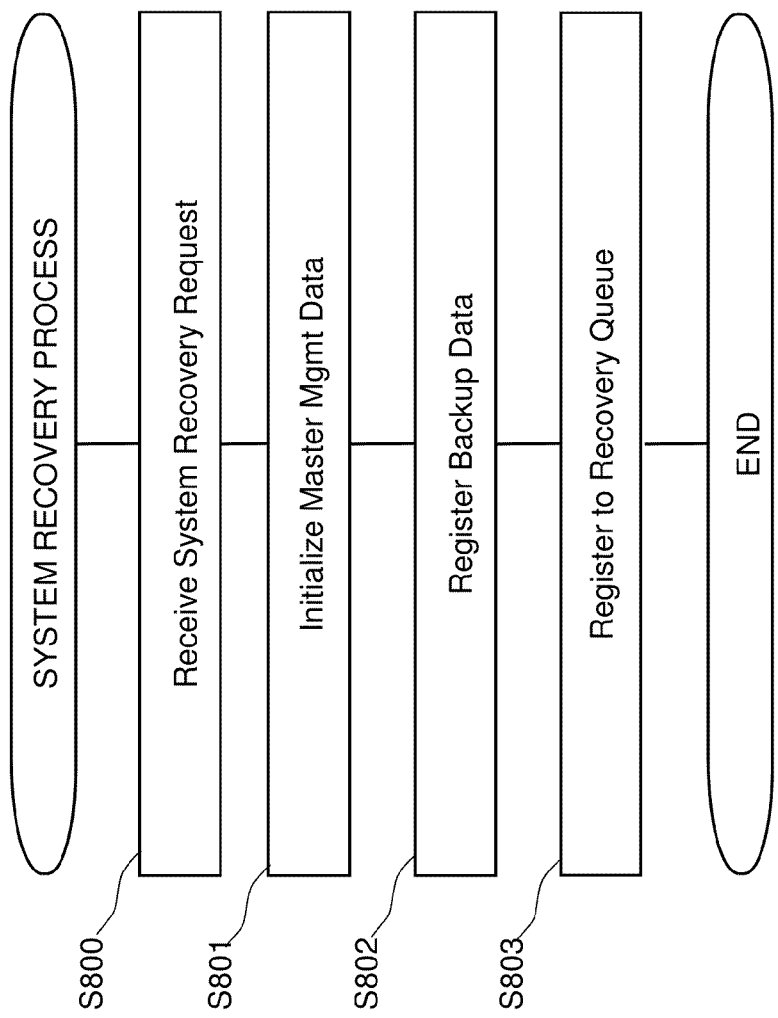
FIG. 10 This is a flow chart of an embodiment of a system recovery process.

In the step S800 in FIG. 10, the system initialization controller 130 receives a system recovery request. This system recovery request is sent in response to a user's operation of initiating a system recovery. Then, the step S801 is executed.

In the step S801, a master management function is initialized. Specifically, the file management system is re-installed using, for example, an installer. Then, the step S801 is executed.

In the step S802, backup data contained in the backup virtual drive 5b (the backup storage group 8) is registered to the master side. Specifically, the metadatabase 210a for the master virtual drive 5a is re-constructed using the metadatabase 210b for the backup virtual drive 5b. More specifically, each record (file information) in the metadatabase 210b is stored in the metadatabase 210a for the master virtual drive 5a with the same ID. Then, the step S803 is executed.

In the step S803, all the data backed up in the backup storage group 8 is extracted from the metadatabase 210b for the virtual drive 5b and registered in a recovery queue. Registered data is copied to the master storage group 7 asynchronously. Here, as each file is copied for recovery, the metadatabase 210a is re-written so that the physical path in the file information of that file becomes the same as the physical path of the copy target. Then, the system recovery process finishes.

As explained above, the system recovery process in this embodiment obtains backed up files using the metadatabase 210b for the backup drive 5b, and copy the backed-up files for recovery. Namely, since the metadatabase 210a for the master virtual drive 5a can be recovered from the backup, even if unrecoverable errors (such as loss of servers) occur in the master virtual drive 5a, the status of the master virtual drive 5a can be recovered from the backup data.

(Variation)

In the above embodiment, it is assumed that backup processes are executed periodically, but the backup processes can be initiated in another way. For example, when a file is updated, the virtual drive controller 110 may request the backup controller 120 to start a backup process and the backup controller 120 may execute a backup process triggered by a file update event. In this type of configuration, a real time backup will be possible.

EXPLANATION OF LETTERS OR NUMERALS

1. Server Computer
2. User Terminal
3. Communication Network
4. File Management Server
5. Virtual Drive
5a. Master Virtual Drive
5b. Backup Virtual Drive
6. Storage Device
7. Master Storage Group
8. Backup Storage Group
110. Virtual Storage Controller
120. Backup Storage Controller
130. System Initialization Controller
140. Storage Recovery Controller
150. Network Controller
210 Metadatabase
220 Backup Status Management Database
230 Operation History Management Database

The invention claimed is:

1. A file management system comprising a computer processor and a memory for controlling multiple storage devices through the computer processor and the memory, wherein the file management system further comprises:
   a virtual drive controller which controls virtual drives composed of an arbitrary set of the storage devices;
   a metadatabase which contains information to associate a virtual file on the virtual drive with a physical file stored in the storage device;
   a master virtual drive which users operate, controlled by the virtual drive controller;
   a backup virtual drive which backs up data in the master virtual drive, controlled by the virtual drive controller;
   a backup controller which manages backups of files stored in the virtual drives,
   wherein the backup controller performs backup, triggered by a file update event, and the backup controller monitors load of file management servers composing the file management system and postpones backing up the files, when the load is greater than a predetermined threshold;
   a backup status management database which is used to manage a backup process performed by the backup controller,
   wherein, the virtual drive controller registers information about files to the backup status management database,
   wherein the virtual drive controller restores files by obtaining a backup file corresponding to a file with an error, referring to the metadatabase, when a file access error occurs, and the virtual drive controller's restoration includes the backup controller's creating a recovery file by copying the backup file and the virtual drive controller's updating a link to the file with an error to a link to the recovery file, rewriting the metadatabase; and
   the backup controller performs backup, referring to the backup status management database and the metadatabase; and a storage recovery controller performs storage recovery to recover data managed in a storage device where an error occurs, wherein the storage recovery controller, in performing storage recovery, obtains copy data of the data contained in the storage device where the error occurs, copies the copy data to another storage device composing the same virtual drive as the one that includes the storage device with the error, and rewrites the link information in the metadatabase.

2. The file management system according to claim 1, further comprising:

a system initialization controller which performs a system recovery process to restore a system from backup data, wherein the metadatabase comprises a master metadatabase and a backup metadatabase, the system initialization controller, in performing the system recovery process, obtains the backed-up files, using the backup metadatabase, copying the backed-up files for recovery.

3. A file management method controlling multiple storage devices through a computer processor and a memory, wherein the file management method comprises:

composing a virtual drive with an arbitrary set of the storage devices;

composing a master virtual drive which users operate;

composing a backup virtual drive which backs up data in the master virtual drive;

registering a virtual file on the virtual drive and a physical file stored in the storage device in metadatabase, associating the virtual file and the physical file;

registering information about a file in a backup status management database;

performing file backup from the master virtual drive to the backup virtual drive, referring to the backup status management database and the metadatabase;

recovering a file by obtaining a backup file corresponding to the files with an error, referring to the metadatabase, when a file access error occurs;

accepting execution of a storage recovery process to recover data managed in a storage device where an error occurs; and rewriting link information in the metadatabase, while, in the storage recovery process, obtaining data contained in the storage device with an error and copying the data to another storage device which composes the same virtual drive as the one that includes the storage device with the error.

4. The file management method according to claim 3, wherein: performing file backup is triggered by a file update event.

5. The file management method according to claim 3 wherein:

backing up the file is postponed when the load of file management servers comprising the file management system is greater than a predetermined threshold.

6. The file management method according to claim 3 wherein:

recovering the file further comprises creating a recovery file by copying the backup file and updating a link to the file with an error to the link of the recovery file, by re-writing the metadatabase.

7. The file management method according to claim 3, a master metadatabase and a backup database being provided as the metadatabase, further comprising:

accepting execution of a system recovery process to restore a system from backup data;

copying for recovery, in the system recovery process, a backed-up file by obtaining the backed-up file using the backup metadatabase.

8. A non-transitory computer-readable storage medium having recorded a computer program for controlling multiple storage devices through a computer processor and a memory, causing a computer to execute:

composing a virtual drive with an arbitrary set of the storage devices;

composing a master virtual drive which users operate;

composing a backup virtual drive which backs up data in the master virtual drive;

registering a virtual file on the virtual drive and a physical file stored in the storage device in metadatabase, associating the virtual file and the physical file;

registering information about a file in a backup status management database;

performing file backup from the master virtual drive to the backup virtual drive, referring to the backup status management database and the metadatabase; and recovering a file by obtaining a backup file corresponding to the files with an error, referring to the metadatabase, when a file access error occurs, wherein recovering the file further comprises creating a recovery file by copying the backup file and updating a link to the file with an error to the link of the recovery file, by re-writing the metadatabase.

9. The non-transitory computer-readable storage medium according to claim 8, wherein: performing file backup is triggered by a file update event.

10. The non-transitory computer-readable storage medium according to claim 8, wherein:

backing up the file is postponed when the load of file management servers comprising the file management system is greater than a predetermined threshold.

11. The non-transitory computer-readable storage medium according to claim 8, wherein:

accepting execution of a storage recovery process to recover data managed in a storage device where an error occurs; and rewriting link information in the metadatabase, while, in the storage recovery process, obtaining data contained in the storage device with an error and copying the data to another storage device which composes the same virtual drive as the one that includes the storage device with the error.

* * * * *